W. HARTILL-LAW.
SIDE THRUST BEARING FOR RAILWAY CAR AXLES.
APPLICATION FILED MAR. 30, 1917.
1,254,800.
Patented Jan. 29, 1918.
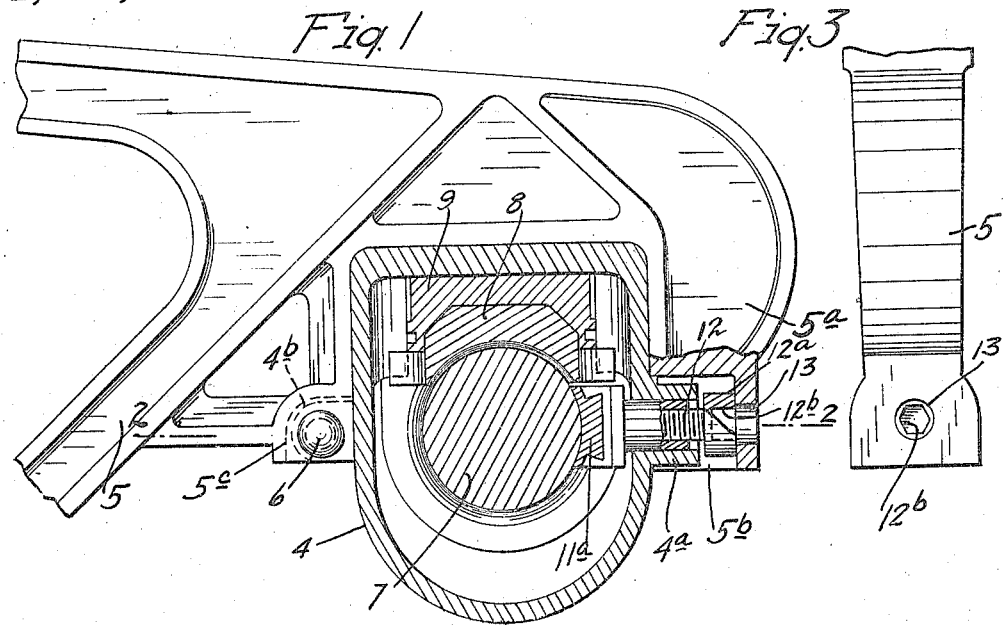
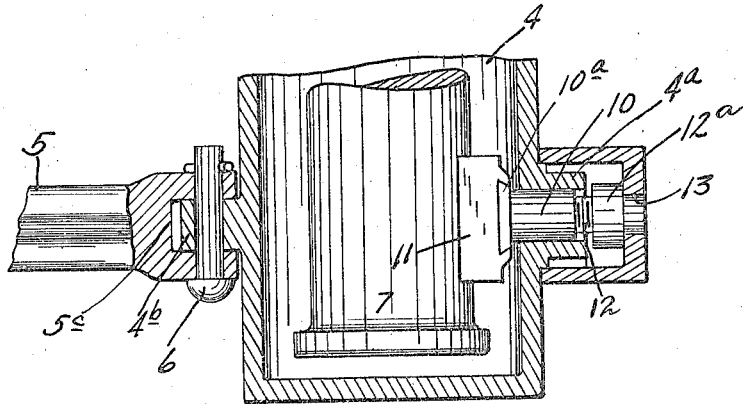
WITNESSES
E. C. Wells
Geo. Knutson
INVENTOR
William Hartill-Law
BY HIS ATTORNEYS
Williamson Merchant

UNITED STATES PATENT OFFICE.

WILLIAM HARTILL-LAW, OF MINNEAPOLIS, MINNESOTA, ASSIGNOR TO BEAMLESS CAR TRUCK SELF-ADJUSTING BRAKE COMPANY, OF MINNEAPOLIS, MINNESOTA, A CORPORATION OF MINNESOTA.

SIDE-THRUST BEARING FOR RAILWAY-CAR AXLES.

1,254,800.     Specification of Letters Patent.     Patented Jan. 29, 1918.

Application filed March 30, 1917. Serial No. 158,575.

*To all whom it may concern:*

Be it known that I, WILLIAM HARTILL-LAW, a citizen of the United States, residing at Minneapolis, in the county of Hennepin and State of Minnesota, have invented certain new and useful Improvements in Side - Thrust Bearings for Railway - Car Axles; and I do hereby declare the following to be a full, clear, and exact description of the invention, such as will enable others skilled in the art to which it appertains to make and use the same.

My invention has for its object to provide a side thrust bearing for car axles, which will resist horizontal thrust produced upon application of car brakes or otherwise, and transmit the stress produced directly to the side frames.

Generally stated, the invention consists of the novel devices and combinations of devices hereinafter defined and described in the claims.

It is a well known fact to all persons familiar with railway car service, that the brake setting actions produce stress which tends to force the axle journals laterally of the journal boxes, to-wit, longitudinally of the truck side frames, out of their initial and properly alined positions in respect to the bearing brasses, and that this in time, will produce wear on the brasses that will elongate, or increase, the arc of the journal engaging surface of the brasses. This soon produces such deformation of the journal engaging surface of the brasses that the axles will not be properly alined therewith nor properly seated therein.

My invention provides a so-called thrust bearing which is independent of the bearing brasses and which is located at the horizontal center line of the axle journal and at the center of the side frame and, moreover, is arranged to re-act against the side frame.

These thrust bearings for the axle journals involve other important features to be hereinafter described in connection with the accompanying drawings, which illustrate the preferred form of the invention, and wherein like characters indicate like parts throughout the several views.

Referring to the drawings:

Figure 1 is a fragmentary view, partly in side elevation and partly in vertical section, illustrating my invention as applied to a truck side frame journal box and axle;

Fig. 2 is a horizontal section on the line 2—2 of Fig. 1; and

Fig. 3 is a fragmentary rear end elevation of the truck side frame, some parts being broken away, and the journal box being removed.

The journal box 4 is, or may be, of the Master Car Builders' type, except for certain details hereinafter noted. This journal box, as shown, is seated in one end of a truck side frame 5 which, so far as this invention is concerned, may take various forms. As shown, however, this side frame is a special design but of a general type known as a Queen truss type in which the upper compression member and the lower tension member are joined together immediately over the center of the box. This side frame at both ends is formed with open bottomed journal box seats that embrace and closely fit the journal boxes. The heavy depending end portion 5ª of the side frame is formed with an open bottomed recess at 5ᵇ that receives and has ample clearance from a boss 4ª formed on the adjacent side of the box. At its opposite side the box is provided with a lug 4ᵇ that fits between a bifurcated portion 5ᶜ of the side frame and is adapted to be detachably interlocked thereto by a pin or bolt 6.

The axle 7 is of the usual construction and, as shown, engages with the customary bearing brasses 8 which, in turn, are seated in the wedge 9 in the customary way, the said parts being preferably of the Master Car Builders' type.

The thrust bearing, in its preferred form, is constructed as follows:

A cantaliver thrust bolt 10 is mounted to slide endwise through a boss 4ª and through that side of the journal box. This thrust bolt has its axis on a horizontal line that approximately intersects the axis of the axle 7, and it is provided with a flat, vertically extended dovetailed inner end 10ª. Mounted to move vertically on the dovetailed end 10ª, is a thrust head or shoe 11 preferably provided with a replaceable journal engaging lining 11ª of Babbitt or other suitable metal which is softer than the head 11, the latter being preferably of iron or steel. This lining 11ª has a concave surface that fits the axle journal.

A thrust bolt 10 has an internally threaded bore that is engaged by an adjusting screw 12 provided at its outer end with a head 12ª that is seated against the outer end wall of the recess 5ᵇ which, as noted, is formed in the depending end portion of the side frame 5. This head 12ª has a recessed angular seat 12ᵇ that is alined with a larger perforation 13 formed in the said engaged end wall. The perforation 13 permits the application of a wrench or key into the seat 12ᵇ for the purpose of adjusting the screw 12. The head 12ª of the screw 12 has such clearance from the boss 4ª that when it is screwed against the same, the thrust bolt 10 and thrust head 11 will be retracted far enough to permit the concave surface of the lining or wearing surface 11ª to clear the axle journal by horizontal movement. This, as is evident, permits the journal box to be readily placed in working position, or to be removed from the side frame.

When the adjusting screw is tightened, as shown in Fig. 1, and the pin 6 is also applied, as therein shown, the journal box will be securely interlocked to the side frame so that said parts will not separate even if the car is derailed. Obviously, adjustments of the screw 11 will compensate for wear of the lining or bearing surface 11ª. Also the concave form of the said lining will keep the thrust head 11 always alined with the axle, and as the bearing brasses 8 wear away, will permit the thrust bolt to lower without lowering the said thrust head, thereby compensating for wear of the said brasses and of the axle journal. These adjustments are, of course, of great importance.

When the bearing is set up to the axle, the end of the screw head will bear against the inside of the end of the side frame and transmit any and all thrust stress directly to the said frame, whether produced by brake action or any other cause, relieving main bearings, wedges, etc., from side stress and wear.

To release the thrust bearing, turn the screw in an opposite direction and the inner face of the screw head will bear against the axle box hub, withdrawing the thrust bearing from the car axle, ready for removal of the bearing metal when desired.

What I claim is:

1. The combination with a truck side frame and an axle journaled thereto, of a lateral thrust bearing independent of said journal proper, anchored to said side frame and resisting lateral movements of said axle in a horizontal direction.

2. The combination with a truck side frame and an axle journaled thereto by a bearing that engages the upper portion of said axle leaving the lower and side portions thereof exposed, of a lateral thrust bearing independent of the journal proper, anchored to said side frame and resisting movement of said axle in a horizontal direction.

3. The combination with a truck side frame and an axle journaled thereto by a bearing that engages the upper portion of said axle leaving the lower and side portions thereof exposed, of a lateral thrust bearing independent of the journal proper, anchored to said side frame and resisting movement of said axle in a horizontal direction, the said lateral thrust device having a head that is adjustable horizontally toward and from the axle to compensate for wear thereof and is movable vertically to compensate for wear of the said journal proper.

4. The combination with a truck side frame and journal box anchored thereto, of an axle journaled in said box, and a lateral thrust bearing independent of the journal proper, anchored to said side frame and resisting lateral movement of the axle in a horizontal direction.

5. The combination with a truck side frame and journal box anchored thereto, of an axle journaled in said box, and a lateral thrust bearing independent of the journal proper, anchored to said side frame and resisting lateral movement of the axle in a horizontal direction, and means for adjusting said thrust bearing longitudinally to compensate for wear between the same and the axle.

6. The combination with a truck side frame and journal box anchored thereto, of an axle journaled in said box, and a lateral thrust bearing independent of the journal proper, anchored against said side frame and resisting lateral movement of the axle in a horizontal direction, the said thrust device having an axle engaging head that is self-adjusting in a vertical direction to compensate for wear of the journal proper.

7. The combination with a truck side frame and journal box anchored thereto, of an axle, an axle engaging bearing within said box carrying the box and its load on said axle, and a thrust bearing comprising a thrust bolt extended horizontally through one side of said journal box and provided at its inner end with an axle engaging thrust head, and an adjusting screw engaging said thrust bolt and reacting against said side frame.

8. The combination with a truck side frame and journal box anchored thereto, of an axle, an axle engaging bearing within said box carrying the box and its load on said axle, and a thrust bearing comprising a thrust bolt extended horizontally through one side of said journal box and provided at its inner end with an axle engaging thrust head, and an adjusting screw engaging said thrust bolt and reacting against said side frame, the head of said screw having an angular recess and the said frame having a perforation alined with said recess, whereby a tool may be applied to said angular recess to thereby rotate and adjust said screw.

In testimony whereof I affix my signature in presence of two witnesses.

WILLIAM HARTILL-LAW.

Witnesses:
CLARA DEMAREST,
MAY A. SMITH.

Copies of this patent may be obtained for five cents each, by addressing the "Commissioner of Patents, Washington, D. C."